United States Patent
Sakai et al.

(12) 
(10) Patent No.: US 6,472,952 B1
(45) Date of Patent: Oct. 29, 2002

(54) ANTENNA DUPLEXER CIRCUIT WITH A PHASE SHIFTER ON THE RECEIVE SIDE

(75) Inventors: Yukio Sakai, Hyogo (JP); Kazuhiro Yahata, Aichi (JP); Michiaki Tsuneoka, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/600,071

(22) PCT Filed: Nov. 8, 1999

(86) PCT No.: PCT/JP99/06191

§ 371 (c)(1),
(2), (4) Date: Sep. 5, 2000

(87) PCT Pub. No.: WO00/28673

PCT Pub. Date: May 18, 2000

(30) Foreign Application Priority Data

Nov. 10, 1998 (JP) .......................................... 10-318736

(51) Int. Cl.[7] .............................................. H01P 1/213
(52) U.S. Cl. ...................................... 333/126; 333/134
(58) Field of Search ................................ 333/126, 132, 333/129, 134

(56) References Cited

U.S. PATENT DOCUMENTS

| 4,692,726 A | | 9/1987 | Green et al. ................ 333/206 |
| 5,554,960 A | * | 9/1996 | Ohnuki et al. .............. 333/132 |
| 5,768,692 A | * | 6/1998 | Kwak ......................... 333/129 |
| 5,784,687 A | * | 7/1998 | Itoh et al. ................... 333/126 |
| 5,903,820 A | * | 5/1999 | Hagstrom .................... 333/124 |
| 6,032,031 A | | 2/2000 | Takaki ........................ 455/245.2 |

FOREIGN PATENT DOCUMENTS

| JP | 1-133477 | 5/1989 | ........... H04N/5/46 |
| JP | 1-503428 | 11/1989 | ........... H01P/1/205 |
| JP | 3-101523 | 4/1991 | ........... H04B/1/04 |
| JP | 6-7332 | 1/1994 | ........... H04B/1/38 |
| KR | 1998-0009080 | 7/1989 | ........... H04N/5/46 |
| KR | 1998-033270 | 7/1998 | ........... H04B/1/10 |

OTHER PUBLICATIONS

Japanese Search Report corresponding to application No. PCT/JP99/06191 dated Feb. 8, 2000.

* cited by examiner

Primary Examiner—Justin P. Bettendorf
Assistant Examiner—Damian E. Cathey
(74) Attorney, Agent, or Firm—RatnerPrestia

(57) ABSTRACT

A high frequency wireless circuit apparatus is formed by connecting a phase shifter between an antenna duplexer and a low noise amplifier, so that the impedance of the receiving terminal of the antenna duplexer at a transmission frequency and the input impedance of the low noise amplifier may not be matched in complex conjugates of each other. Therefore it prevents the transmission output passing through the receiving terminal of the antenna duplexer and the interference signal entered through the antenna from making the cross modulation in the low noise amplifier. Thus it improves the reception sensitivity and immunity to interference signals of the high frequency wireless circuit apparatus at the same time.

4 Claims, 5 Drawing Sheets

ANTENNA DUPLEXER CIRCUIT WITH A PHASE SHIFTER ON THE RECEIVE SIDE

This application is a U.S. National Phase Application of PCT International Application PCT/JP99/06191.

DESCRIPTION

1. Technical Field

The present invention relates to a high frequency wireless circuit apparatus mainly used in mobile communication appliances such as a portable telephone and an information communication terminal.

2. Background Art

Generally, the high frequency wireless circuit apparatus of this type has been composed as shown in FIG. 6. In the drawing, the reference numeral 11 denotes an antenna; 12 denotes a switch; 13 denotes an antenna duplexer; 14 denotes an isolator; 15 denotes a power amplifier; 16 denotes a low noise amplifier; 17 denotes a transmitting input terminal; and 18 denotes a receiving output terminal. The antenna duplexer 13 and the low noise amplifier 16 have been connected directly without any interposing means. Reference numerals 21, 22 are respectively a transmitting terminal and a receiving terminal of the antenna duplexer 13.

The transmission signal input from the transmitting input terminal 17 is amplified in the power amplifier 15, and is fed into the transmitting terminal 21 of the antenna duplexer 13 through the isolator 14. The isolator 14 is provided so that the transmission characteristic of the power amplifier 15 may not fluctuate even if the load of the antenna 11 changes. The transmission signal output from the antenna duplexer 13 is radiated into the air from the antenna 11 through the switch 12.

On the other hand, the reception signal input from the antenna 11 is fed into the antenna duplexer 13 through the switch 12, and is output into the receiving terminal 22 of the antenna duplexer 13. This reception signal is input to the low noise amplifier 16 through a phase shifter 10, and amplified, and sent out to the receiving output terminal 18.

The transmission signal fed into the antenna duplexer 13 is also sent to the receiving terminal 22 of the antenna duplexer 13. The switch 12 is not always necessary, or two or more switches may be connected to the contrary.

In such conventional structure, however, when the antenna duplexer 13 and the low noise amplifier 16 are directly connected, the transmission power amplified in the power amplifier 15 passes through the receiving terminal 22 of the antenna duplexer 13 and is mixed into the low noise amplifier 16. The transmission power amplified possibly causes cross modulation with an incoming interference signal from the antenna 11. As a result the reception sensitivity deteriorates.

In particular, this phenomenon occurs frequently in the CDMA system wireless communication, and it has been difficult to satisfy the interference wave input level of −30 dBm in the single wave interference characteristic determined in the standard.

That is, in the case of CDMA system wireless communication, the transmission signal output to the reception signal terminal 22 of the antenna duplexer 13 is modulated by CDMA, and has a modulation band width. On the other hand, the reception signal input through the antenna 11 is a CDMA modulated wave same as the transmission signal, but the interference signal input through the antenna 11 is a non-modulated signal. When the nonmodulated interference wave and the CDMA modulated transmission signal are fed into the low noise amplifier 16, the two-wave input distortion occurs. Then the intermodulation distortion and cross modulation distortion occurs. The CDMA modulated wave has a band. Then the wave caused by the cross modulation of interference waves and the transmission wave covers the reception signal band, thereby disabling the reception.

Disclosure of the Invention

It is hence an object of the invention to enhance the reception sensitivity and immunity to interference signals in a high frequency wireless circuit apparatus used in mobile communication appliances such as a portable telephone and an information communication terminal.

To achieve the object, the high frequency wireless circuit apparatus of the invention is composed by connecting a phase shifter between an antenna duplexer and a low noise amplifier, so that the impedance of the receiving terminal of the antenna duplexer at a transmission frequency and the input impedance of the low noise amplifier may not be matched in complex conjugates of each other. It prevents the transmission output passing through the receiving terminal of the antenna duplexer and the interference signal entered through the antenna from causing the cross modulation in the low noise amplifier. Thus the reception sensitivity and immunity to interference signal of the high frequency wireless circuit apparatus improve at the same time.

DETAILED DESCRIPTION OF PREFERRED EMBODIMENTS

In the high frequency wireless circuit apparatus of the invention, a switch is connected between an antenna and an antenna terminal of an antenna duplexer, an isolator is connected between a transmitting terminal of the antenna duplexer and an output terminal of a power amplifier, and a phase shifter is provided between a receiving terminal of the antenna duplexer and an input terminal of a low noise amplifier. Thus the reception sensitivity and immunity to interference signal of the high frequency wireless circuit apparatus can be enhanced simultaneously.

Preferably, an impedance of the receiving terminal of the antenna duplexer at the transmission frequency is shifted by the phase shifter by at least ±45 degrees or more from the point at which the impedance matches with an input impedance of the low noise amplifier in complex conjugates of each other. By the constitution in which the impedance of the receiving terminal of the antenna duplexer at the transmission frequency and the input impedance of the low noise amplifier may not be matched in complex conjugates of each other. Thus the reception sensitivity and immunity to interference signal of the high frequency wireless circuit apparatus can be enhanced effectively.

Preferably, the phase shifter is composed of a transmission line, and the freedom of a connection between the receiving terminal of antenna duplexer and the input terminal of low noise amplifier can be enhanced.

Preferably, the phase shifter is composed of a band pass filter, so that the high frequency wireless circuit apparatus can be further reduced in size.

Preferably, the switch, antenna duplexer, isolator and power amplifier are formed at one side of a double-sided multi-layer substrate, and the phase shifter and low noise amplifier are formed at the other side of the double-sided multi-layer substrate. Thus a direct coupling of transmission signal with the low noise amplifier is prevented, so that the reception sensitivity and immunity to interference signals of the high frequency wireless circuit apparatus can be enhanced at the same time.

(Embodiment 1)

Figure 1:
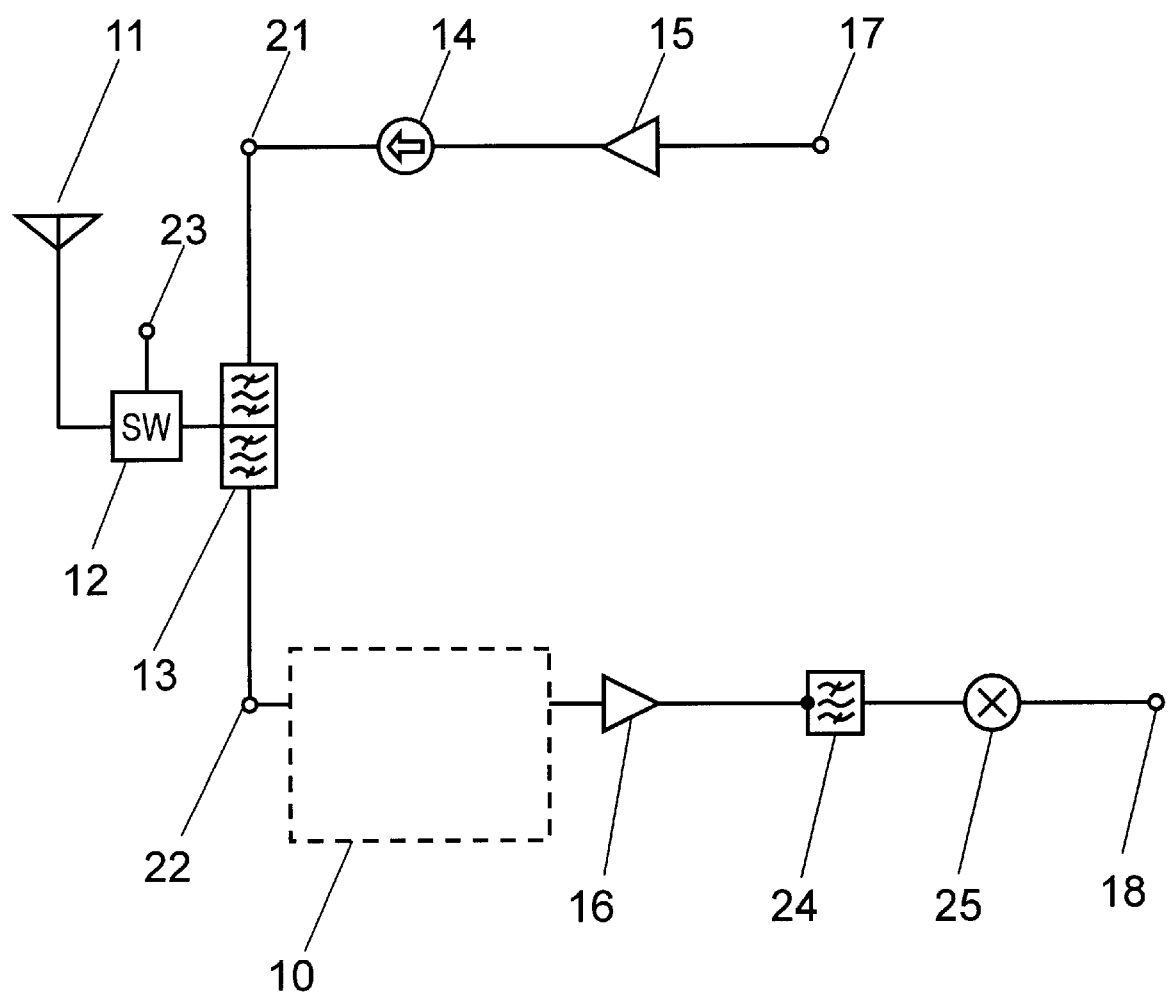
FIG. 1 is an electric circuit diagram showing a schematic configuration of a high frequency wireless circuit apparatus in embodiment 1 of the invention.

FIG. 1 is an electric circuit diagram showing a schematic configuration of a high frequency wireless circuit apparatus in embodiment 1 of the invention. In the case of CDMA system wireless communication, as the antenna input and output section, generally, the high frequency wireless circuit apparatus as shown below is used.

That is, a switch 12 connected between an antenna 11 and an antenna duplexer 13 is provided for testing the high frequency wireless circuit apparatus from outside, and the switch 12 may be composed of either a mechanical type for changing over the signal path or a semiconductor element type. When testing from outside, the antenna duplexer 13 is electrically disconnected from the antenna 11, and is connected to an external terminal 23.

The antenna duplexer is provided for separating the transmission frequency and reception frequency, and in particular a sufficient separation characteristic is established so that the transmission output may not leak to the reception side. In the embodiment, this separation characteristic is 56 dB or more so that the reception sensitivity may not deteriorate. The antenna duplexer 13 may be composed of either dielectric element or SAW.

A low noise amplifier 16 is provided for lowering the noise level at the reception side, and it enhances the reception sensitivity of the system. In the embodiment, the forward power gain of the low noise amplifier 16 is 18 dB or more, the noise figure is 1.5 dB or less, and the equivalent input third-order intermodulation distortion characteristic −1 dBm or more.

An isolator 14 is connected between a power amplifier 15 and the antenna duplexer 13. The isolator 14 transmits the transmission signal only in one direction of the antenna duplexer 13 from the power amplifier 15. Therefore, if the load of the power amplifier 15 is changed depending on the antenna 11, the output side of the power amplifier 15 is free from the effects, thereby preventing the deterioration of adjacent-channel leakage power characteristic of the power amplifier 15. As shown in FIG. 1, a phase shifter 10 is used in the embodiment.

The phase shifter 10 is constituted so that the impedance of a receiving terminal 22 of the antenna duplexer 13 at transmission frequency and the input impedance of the low noise amplifier 16 may not be matched in complex conjugates of each other. Hence, the transmission signal passing through the receiving terminal 22 of the antenna duplexer 13 and the interference signal entered from the antenna 11 do not cause cross modulation in the low noise amplifier 16. Since the impedance of the receiving terminal 22 of the antenna duplexer 13 at the transmission frequency and the input impedance of the low noise amplifier 16 are not matched at complex conjugates of each other, the transmission signal power entered in the low noise amplifier 16 may be minimum. Thus the reception sensitivity and immunity to interference signal of the high frequency wireless circuit apparatus may be enhanced.

Incidentally, the phase shifter 10 is not particularly required to shift the reception frequency. If the reception frequency is shifted, the desired reception signal may be mismatched with the input impedance of the low noise amplifier 16, and it is hard to feed into the low noise amplifier 16. This embodiment is particularly effective in the CDMA system wireless communication in which the transmission frequency and reception frequency are close to each other, but it is sufficiently effective also in the conventional FDMA or TDMA system wireless communication in which the transmission frequency and reception frequency are remote from each other.

A filter 24 is connected in a later stage of the low noise amplifier 16, and the filter 24 is followed by a reception mixer 25. The input impedance of this filter is designed to be matched at the reception frequency and mismatched at the transmission frequency. Therefore the input impedance of the low noise amplifier 16 has an effect of the input impedance of the filter 24. Therefore, shifting of the transmission frequency by the phase shifter 10 is effective.

Figure 2:
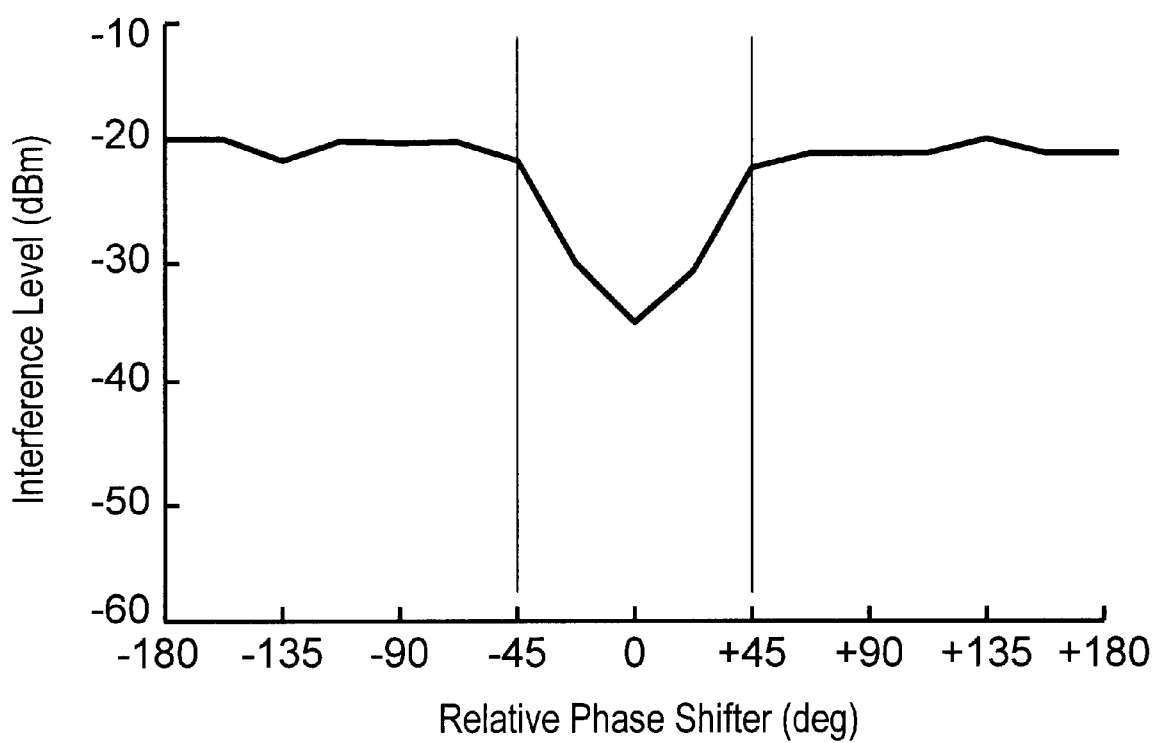
FIG. 2 is an electric characteristic diagram of the high frequency wireless circuit apparatus in embodiment 1 of the invention.

FIG. 2 is an electric characteristic diagram of the high frequency wireless circuit apparatus in embodiment 1 of the invention. In FIG. 2, the axis of abscissas represents the shifting extent of the impedance of transmission frequency by the phase shifter 10 at the receiving terminal 22 of the antenna duplexer 13, and the axis of ordinates denotes the level of interference signal entered through the antenna 11. As shown in FIG. 2, when the shifting extent of the impedance at the transmission frequency at the receiving terminal 22 of the antenna duplexer 13 by the phase shifter 10 is more than ±45 degrees, a signal can be entered from the antenna 11 to a certain interference signal level. However, when the shifting extent is smaller than ±45 degrees, the allowable values of interference signal levels deteriorate extremely.

In the embodiment, the shifting extent of impedance at the transmission frequency at the receiving terminal 22 of the antenna duplexer 13 by the phase shifter 10 is set at 70 to 110 degrees so as to be realized easily in an actual circuit, but the non-deteriorating range of characteristic may be defined by the shifting extent ranging from −180 to −45 degrees, or 45 to 180 degrees. Hence it is possible to alleviate the equivalent input third-order intermodulation distortion characteristic of the low noise amplifier 16. Or, the input level of interference wave can be increased.

(Embodiment 2)

Figure 3:
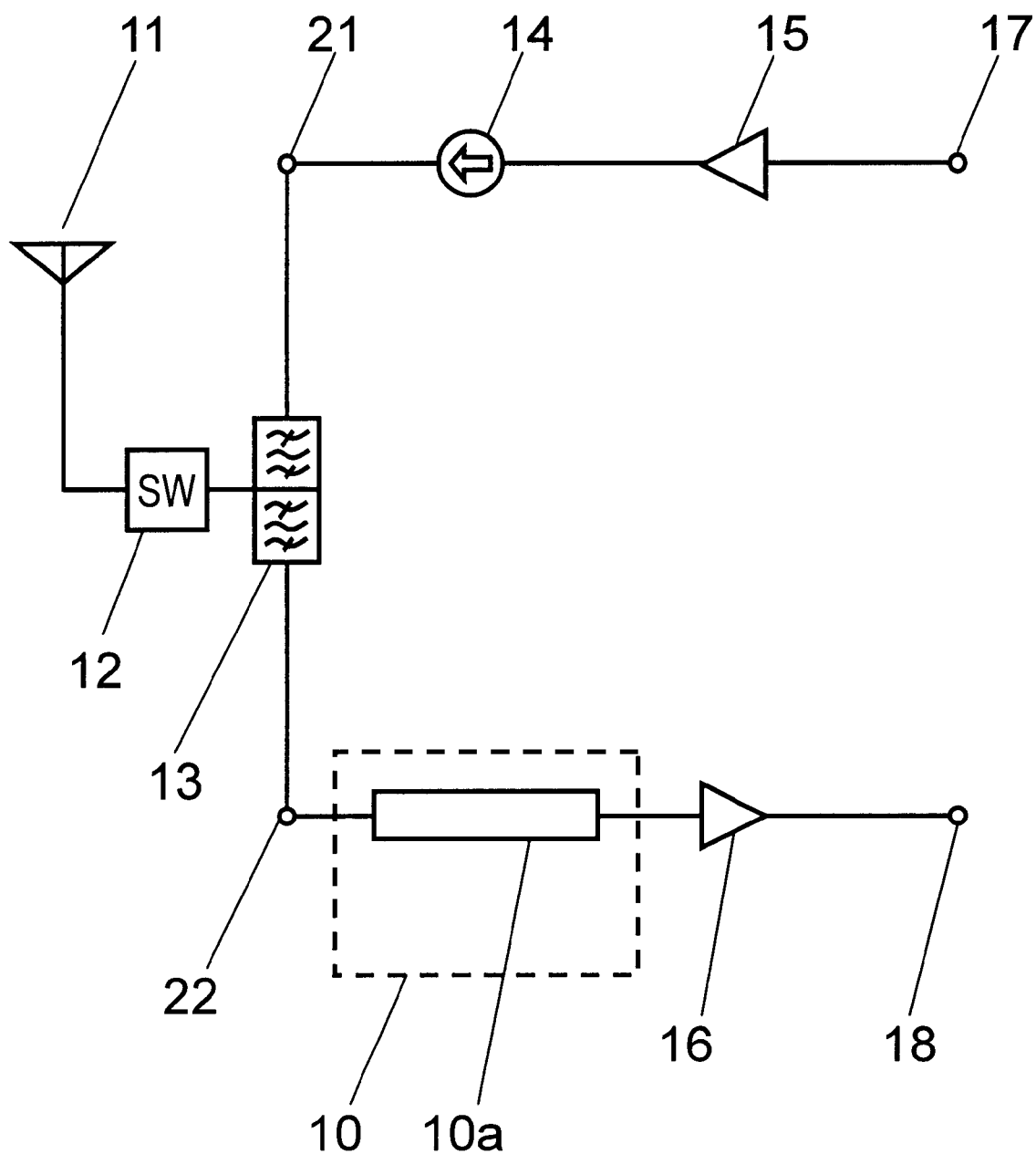
FIG. 3 is an electric circuit diagram showing a schematic configuration of a high frequency wireless circuit apparatus in embodiment 2 of the invention.

FIG. 3 is an electric circuit diagram showing a schematic configuration of a high frequency wireless circuit apparatus in embodiment 2 of the invention. As shown in FIG. 3, the phase shifter 10 is composed of a transmission line 10a. A microstrip line, a strip line, a coaxial line, or any other system may realize the transmission line 10a. In the embodiment, in particular, microstrip lines or strip lines connect the receiving terminal 22 of the antenna duplexer 13 and the low noise amplifier 16. This is because the transmission loss is reduced between the receiving terminal 22 of the antenna duplexer 13 and the low noise amplifier 16, and the connection is easy.

In the embodiment, the connection between the receiving terminal 22 of the antenna duplexer 13 and the low noise amplifier 16 is realized from one side of the double-sided substrate to the other side of the double-sided substrate. When this double-sided substrate is composed in a multi-layer substrate, it is effective for the inner layer grounding to prevent high-frequency coupling of the transmission signal with the low noise amplifier 16.

(Embodiment 3)

Figure 4:
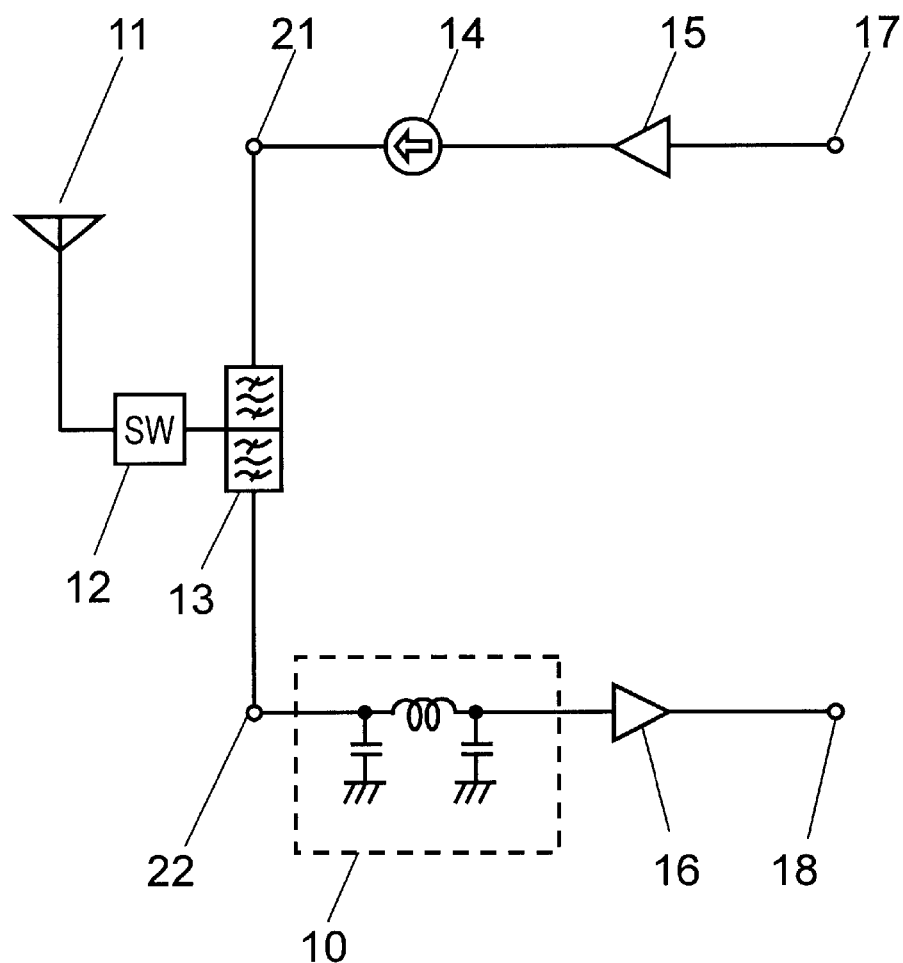
FIG. 4 is an electric circuit diagram showing a schematic configuration of a high frequency wireless circuit apparatus in embodiment 3 of the invention.

FIG. 4 is an electric circuit diagram showing a schematic configuration of a high frequency wireless circuit apparatus in embodiment 3 of the invention. As shown in FIG. 4, the phase shifter 10 is composed of a band pass filter. Herein, the state composed by the transmission line 10a is realized with lumped element circuits, and it is composed of capacitors and a coil.

In this composition, by adjusting the capacitor or coil, the shifting extent of the phase shifter 10 can be freely changed, so that the reception sensitivity and immunity to interference signal of the high frequency wireless circuit apparatus can be optimally enhanced.

In FIG. 4, in order to minimize the effects of second harmonics and third harmonics of the transmission signal, the band pass filter for composing the phase shifter 10 is of low pass type. However, a high pass type may also realize the phase shifter 10.

(Embodiment 4)

Figure 5:
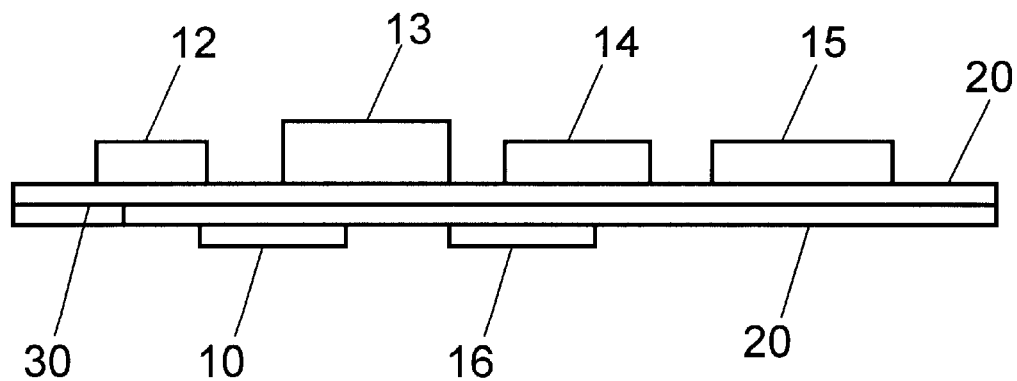
FIG. 5 is a mounting layout showing a schematic configuration of a high frequency wireless circuit apparatus in embodiment 4 of the invention.
Figure 6:
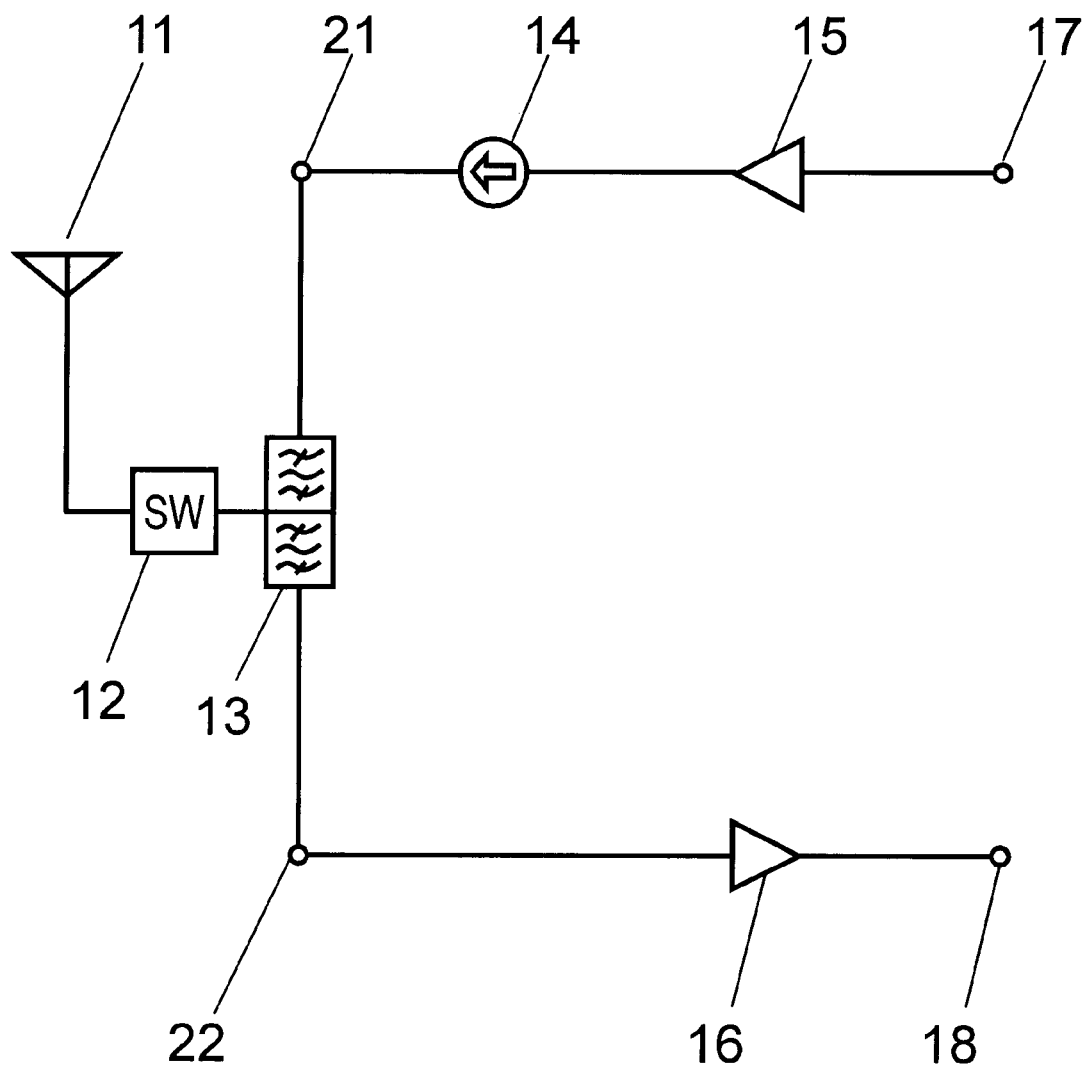
FIG. 6 is an electric circuit diagram showing a conventional high frequency wireless circuit apparatus.

FIG. 5 is a mounting layout of a high frequency wireless circuit apparatus in embodiment 4 of the invention. As shown in FIG. 5, the switch 12, antenna duplexer 13, isolator 14 and power amplifier 15 are formed at one side of a double-sided substrate 20, and the phase shifter 10 and low noise amplifier 16 are formed at other side of the double-sided substrate 20. In this state, an intermediate layer 30 of the double-sided substrate 20 is a grounding pattern.

In this constitution, therefore, by the grounding pattern of the intermediate layer 30 of the double-sided substrate 20, direct mixing of transmission output from the power amplifier 15 into the low noise amplifier 16 is shielded. As the result, the reception sensitivity and immunity to interference signal of the high frequency wireless circuit apparatus can be enhanced at the same time.

Incidentally, the phase shifter 10 may be disposed at one side only of the double-sided substrate 20. In this constitution, the transmission unit and reception unit can be separated by the double-sided substrate 20.

INDUSTRIAL APPLICABILITY

According to the invention, as described herein, a switch is connected between an antenna and an antenna terminal of an antenna duplexer, an isolator is connected between a transmitting terminal of the antenna duplexer and an output terminal of a power amplifier, and a phase shifter is provided between a receiving terminal of the antenna duplexer and an input terminal of a low noise amplifier Therefore the reception sensitivity and immunity to interference signals of the high frequency wireless circuit apparatus can be enhanced simultaneously. It also solves the problems of deterioration of reception sensitivity due to cross modulations caused by the interference signal entered through the antenna and the transmission power amplified by the power amplifier, which passes through the receiving terminal of the antenna duplexer and mixes into the low noise amplifier.

What is claimed is:

1. A high frequency wireless circuit apparatus for transmitting and receiving through an antenna duplexer, comprising:

an antenna connected to an antenna terminal of said antenna duplexer;

an isolator connected between a transmitting terminal of said antenna duplexer and an output terminal of a power amplifier; and a phase shifter disposed between a receiving terminal of said antenna duplexer and an input terminal of a low noise amplifier, wherein a switch, said antenna duplexer, said isolator and said power amplifier are formed on one side of a double-sided multi-layer substrate, and said phase shifter and said low noise amplifier are formed at the other side of said double-sided multi-layer substrate.

2. The high frequency wireless circuit apparatus of claim 1, wherein said phase shifter shifts an impedance of the receiving terminal of said antenna duplexer at a transmission frequency by at least ±45 degrees or more from a point at which the impedance matches with an input impedance of the low noise amplifier in complex conjugates of each other.

3. The high frequency wireless circuit apparatus of claim 1, wherein said phase shifter is composed of a transmission line.

4. The high frequency wireless circuit apparatus of claim 1, wherein said phase shifter is composed of a band pass filter.

* * * * *